Figure 1:
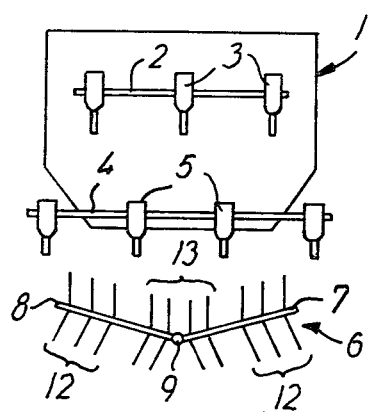

United States Patent [19]

Jensen et al.

[11] 4,382,474
[45] May 10, 1983

[54] SOIL CULTIVATING IMPLEMENT COMPRISING A TINED HARROW AND A TRAILING BLADE ROTOR

[75] Inventors: Finn U. H. Jensen, Vemmelev; Sven-Åge Randløv, Slagelse, both of Denmark

[73] Assignee: Kongskilde Koncernselskab A/S, Sorø, Denmark

[21] Appl. No.: 133,909

[22] Filed: Mar. 25, 1980

[30] Foreign Application Priority Data

Apr. 6, 1979 [DK] Denmark ............................ 1517/79

[51] Int. Cl.³ .............................................. A01C 5/06
[52] U.S. Cl. .................................... 172/179; 172/198
[58] Field of Search ............... 172/142, 156, 157, 160, 172/159, 178, 179, 182, 145, 196, 198, 567, 599, 688

[56] References Cited

U.S. PATENT DOCUMENTS

| | | | |
|---|---|---|---|
| 1,040,049 | 10/1912 | Steele | 172/156 |
| 1,503,467 | 8/1924 | Bertella | 172/179 |
| 2,758,531 | 8/1956 | Seims | 172/142 |
| 4,213,408 | 7/1980 | West | 172/196 |

FOREIGN PATENT DOCUMENTS 2806300 8/1979 Fed. Rep. of Germany ...... 172/178

*Primary Examiner*—Richard J. Apley
*Assistant Examiner*—David J. Brown
*Attorney, Agent, or Firm*—Anthony A. O'Brien

[57] ABSTRACT

In a soil cultivating implement comprising a harrow with tines and a trailing bladed rotor for smoothing the furrowy nature of the field surface left behind the rear row of harrow tines, the blades of said rotor are arranged in groups with intermediate spaces aligned with the harrow tines of the rear row of tines. Each group comprises at least three rings of blades which all work the earth ridges left behind the harrow.

1 Claim, 4 Drawing Figures

SOIL CULTIVATING IMPLEMENT COMPRISING A TINED HARROW AND A TRAILING BLADE ROTOR

It is generally known that a tined harrow leaves the soil surface with an undulated or furrowy pattern for which the rearmost row of the harrow tines is primarily responsive, because said tines draw rather deep, parallel furrows with ridges therebetween. During the subsequent work in the field such a surface might cause inconveniencies, so that a levelling or smoothing is often desirable. At the same time a certain crumbling of the coarser earth clods is aimed at.

A relatively cheap solution to this problem is to couple a non-driven and obliquely running cutting drum or blade rotor after the harrow. In a known embodiment such a blade rotor comprises a shaft that may be composed of a series of shaft sections with intermediate universal joints and carrying a plurality of equidistant rings of blades or knives adapted to displace the earth laterally during rotation and to crumble simultaneously greater clods. It has, however, been shown in practice that the use of such blade rotors as a rule does not lead to a fully satisfactory result, because the furrow pattern still remains after the passage of the implement, although more blurred.

It is an object of the invention to provide a more efficiently working implement of the above mentioned kind, and more particularly the invention relates to a soil cultivating implement of the known type comprising a harrow with one or more rows of harrow tines and a trailing blade rotor adapted to levelling the furrows and ridges left behind by the harrow tines. According to the invention this implement is characterised in that the blades are groupwise arranged, each group comprising at least three rings of blades or knives, and each space between adjacent groups being somewhat less than the group width and being substantially aligned, in the working direction of the implement, with a respective one of the tines of the rearmost row of the harrow tines.

By this arrangement of the blade rings it is ensured that all the blades are operative to work the earth of the ridges, and none of the blades will be idling, more or less, in the furrow areas. For a given number of blades a better sidewise spreading of the earth in the ridges is consequently obtained than by the use of the blade rotor of the previously known design, and in this respect it is also of great importance that no ring of blades occurs in the furrow areas, because such blade rings might throw the earth further on or possibly throw it back towards the ridges and thereby prevent it from filling the furrows.

In case the implement is of the known type in which the blade rotor comprises symmetrical shaft sections adjoining at the centre of the implement and each forming an acute angle with the centre axis of the implement, and where the number of harrow tines forming the rearmost row is even, the abutting ends of the shaft sections may, according to the invention, appropriately together support one group of blade rings consisting of two pairs of blade rings operative to throw the earth laterally outwards in opposite directions, and also the remaining groups of blades may be operative to level the ridges in a direction away from the centre of the implement. When in this case care is taken that the two pairs of blade rings which together constitute the midmost group are closely spaced, this group of blades will ensure an even distribution, to both sides, of the earth forming the centremost ridge left by the harrow, and also the earth of the adjacent ridges will be thrown outwardly from the centre of the implement so that the final result is a levelling of the earth throughout the width of the implement. This does not necessarily imply that the field surface is left completely plane, but the furrow pattern will be blurred to such a degree as not to impede the subsequent work in the field.

In an implement of the same kind but with an uneven number of harrow tines in the rearmost row, a similar good levelling of the earth may be obtained when the groups of cutting blades operating closest to the centre of the implement are adapted to level the ridges inwardly towards the centre, the outermost groups of blade rings being then operative to level the ridges both inwardly towards and outwardly from the centre. The central furrow is hereby refilled with earth that is thrown inwardly towards the centre of the implement, while the outermost furrows are filled with earth from the inner ridges, which inter alia implies the advantage that the length of the blade rotor can be less than the efficient working width and so can be kept within the dimensions allowed for traffic on public roads.

Figure 2:
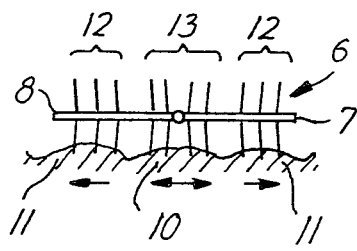

The invention will now be more fully explained with reference to the purely diagrammatical drawings, in which FIG. 1 is a plan view of an embodiment of the implement according to the invention and with four harrow tines in the rearmost row, FIG. 2 is a rear view of the cutting blade rotor of the implement, and FIGS. 3 and 4 similar views of an embodiment with five harrow tines in the rearmost row.

The implement shown in FIG. 1 comprises a harrow 1 which may be of a well known type including a front beam 2 with three harrow tines 3 and a rearmost beam 4 with four harrow tines 5. The harrow trails a non-driven cutting blade rotor 6 comprising two shaft sections 7 and 8 coupled together at the centre of the implement through a common support 9 from where they extend laterally and slightly forwardly in the working direction of the implement.

As shown in FIG. 2 the four harrow tines 5 leave behind three earth ridges with furrows therebetween, viz. a middle ridge 10 and two outer ridges 11. For treating the earth in the outer ridges 11, each of the shaft sections 7 and 8 is provided with an outer group of blades 12 each consisting of three rings of blades operative to throw the earth of the ridges outwardly, as indicated by the arrows in FIG. 2. Also the earth in the centremost ridge 10 shall be thrown outwardly from the centre of the implement to fill the adjacent furrows, and for this purpose a third group of cutting blades 13 is provided which comprises two pairs of blade rings operative to throw the earth laterally outwards in opposite directions.

From FIGS. 1 and 2 it is apparent that spaces are left between the three groups of blades 12 and 13 and that the width of these spaces is somewhat less than that of each group of blades, said spaces being located at the furrow areas in the soil surface.

The mode of operation and the effect of the implement has been explained in the foregoing.

Figure 3:
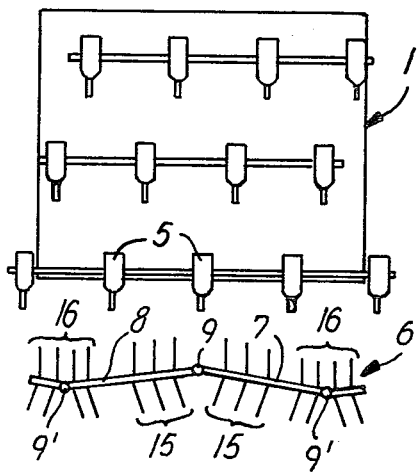
Figure 4:
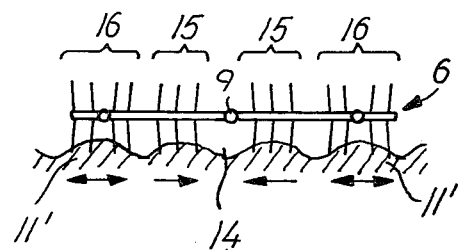

According to the embodiment in FIG. 3 the harrow 1 comprises a considerable number of tines distributed on the three beams, the rearmost one of which has five harrow tines 5. In this case the harrow 1 thus leaves a furrow 14 at the middle, see FIG. 4, to be filled with earth from outside. This is carried out by means of a pair of groups of cutting blades 15 that may correspond to the groups of cutting blades 12 in FIGS. 1 and 2, except that they throw the earth inwardly instead of outwardly. The earth of the two outer ridges 11' shall at the same time be distributed both outwardly and inwardly as illustrated by the arrows in FIG. 4, and two blade groups 16 corresponding to the blade group 13 in FIGS. 1 and 2 serve this purpose. Thus, each group 16 of cutting blades comprises two pairs of blade rings that are positioned on opposite sides of a common support 9'.

We claim:

1. A soil cultivating implement comprising a harrow having a transverse row of harrow tines;

a trailing earth surface levelling rotor device including a plurality of horizontal shaft sections which are inclined at respective opposite angles relative to said row of tines, and soil engaging cutting blades extending from the horizontal shaft sections;

said cutting blades forming a plurality of rings of cutting blades on said shaft sections for laterally displacing earth from the ridges left behind said harrow tines to at least partially fill up the furrows between such ridges;

said rings of cutting blades being arranged in spaced groups, each group comprising at least three of the rings of blades;

each space between adjacent groups being narrower than the width of each group and being substantially aligned, in the working direction of the implement, with a respective one of the tines of said transverse row of tines;

wherein the number of harrow tines in the transverse row of tines is uneven;

wherein said plurality of shaft sections comprise two central and two outer shaft sections;

said central shaft sections being symmetrical and being coupled to each other at the center of the implement at a point aligned with a central one of the harrow tines;

each of said central shaft sections forming an acute angle with the center axis of the implement and diverging from the center coupling point away from the row of tines;

said outer shaft sections being coupled to outer ends of the central shaft sections at points aligned with corresponding spaces between adjacent tines of said tines;

each of said outer shaft sections converging from the outer coupling points toward the row of tines;

said groups of rings of cutting blades including inner groups of rings of cutting blades on the respective central shaft sections aligned with spaces on opposite sides of the central tine and adapted to level ridges inwardly towards the center, and outer groups of rings of cutting blades arranged at the respective outer coupling points with inner pairs of cutting blade rings of the outer groups on outer ends of the respective central shaft sections and with outer pairs of cutting blade rings of the outer groups on inner ends of the respective outer shaft sections, said outer groups of rings of cutting blades being spaced apart from said inner groups of rings of cutting blades by gaps corresponding in lateral position to the positions of said harrow tines which are on opposite sides of the central tine;

said inner pairs of cutting blade rings being operative to level inner ridge portions inwardly towards the center, and said outer pairs of cutting blade rings being operative to level outer ridge portions outwardly from the center.

* * * * *